US008354629B2

(12) United States Patent
Lin

(10) Patent No.: US 8,354,629 B2
(45) Date of Patent: Jan. 15, 2013

(54) COMPUTER KEYBOARD HAVING ILLUMINATED KEYS WITH A SENSED LIGHT CONDITION

(75) Inventor: Jack Lin, Changhua (TW)

(73) Assignee: Tai Chung Precision Steel Mold Co., Ltd., Changhua (TW)

( * ) Notice: Subject to any disclaimer, the term of this patent is extended or adjusted under 35 U.S.C. 154(b) by 398 days.

(21) Appl. No.: 12/768,801

(22) Filed: Apr. 28, 2010

(65) Prior Publication Data

US 2011/0011711 A1 Jan. 20, 2011

(30) Foreign Application Priority Data

Jul. 15, 2009 (TW) ............................... 98212844 U

(51) Int. Cl.
*G01J 1/32* (2006.01)

(52) U.S. Cl. .................................. 250/205; 250/214 AL

(58) Field of Classification Search .................. 250/205, 250/214 AL, 214 R, 227.22, 227.11; 200/310–315, 200/341–345, 517–521; 362/23, 24, 85, 230, 559

See application file for complete search history.

(56) References Cited

U.S. PATENT DOCUMENTS 5,655,826 A * 8/1997 Kouno et al. ................... 362/24

* cited by examiner

*Primary Examiner* — Que T Le

(57) ABSTRACT

An illuminated keyboard includes optical sensors and units each comprising an optically transmissive key member; a scissors-shaped structure having a top secured to the key member; a light guide diaphragm under the scissors-shaped structure; an insulating diaphragm under the light guide diaphragm and including a light source on a top surface, a positive conductor connected to a positive terminal of the light source and on the top surface, a negative conductor connected to a negative terminal of the light source and on a bottom surface, and a bus having one end interconnecting the positive and negative conductors, and the other end connected to the sensor; a film circuit board under the insulating diaphragm and including a holed rubber dome with the key member positioned therein; and a base board with the scissors-shaped structure retained thereon. Brightness is adjusted in response to light condition as sensed by the sensor.

5 Claims, 4 Drawing Sheets

COMPUTER KEYBOARD HAVING ILLUMINATED KEYS WITH A SENSED LIGHT CONDITION

BACKGROUND OF THE INVENTION

1. Field of Invention

The invention relates to keyboards and more particularly to a computer keyboard having uniformly, sufficiently illuminated key members.

2. Description of Related Art

Typically, a keyboard comprises a plurality of key members which display symbols, such as alphanumeric keys, on their top surfaces. A problem with conventional keyboards is that it is often difficult to discern the symbol appearing on top of the key member under poor lighting conditions. This forces a keyboard operator to strain his or her eyes to operate the keys under low light conditions. This has become a much greater problem in present day society as keyboards have become necessary for everyday use.

Moreover, the advent of laptops has resulted in the use of keyboards at places where they were not previously operated. It is often that these places provide limited light making it difficult for keyboard operators to easily operate the keyboard.

A number of prior patents about illuminated keyboard are disclosed. For example, Taiwanese Utility Model Patent No. M324,816 discloses a keyboard with backlight arrangement. However, in practice it is found that keys distal the LED (light-emitting diode) based backlight arrangement are not sufficiently illuminated. That is, keys are not illuminated uniformly.

Also, U.S. Pat. No. 7,608,792 discloses a "Membrane keyboard/keypad with arrangement for uniformly lighting keys from background". Thus, continuing improvements of illuminated keyboard are constantly sought.

SUMMARY OF THE INVENTION

It is therefore one object of the invention to provide a computer keyboard comprising a plurality of optical sensors mounted under a top surface of the computer keyboard; and a plurality of units each comprising an optically transmissive key member; a scissors-shaped structure having a top secured to the key member; a light guide diaphragm disposed under the scissors-shaped structure; an insulating diaphragm disposed under the light guide diaphragm and including a light source on a top surface, a positive conductor electrically connected to a positive terminal of the light source and disposed on the top surface, a negative conductor electrically connected to a negative terminal of the light source and disposed on a bottom surface, and a bus having one end electrically interconnecting the positive conductor and the negative conductor, and the other end electrically connected to the optical sensor; a film circuit board disposed under the insulating diaphragm and including a top holed rubber dome with the key member positioned therein; and a base board including a plurality of anchoring members, wherein the scissors-shaped structure passes the light guide diaphragm, the insulating diaphragm, and the film circuit board to have bottom retained by the anchoring members of the base board; wherein the optical sensors are activated to send electrical signals to the light sources via the buses when illumination of the environment is below a predetermined level, and the light sources are activated to emit light for uniformly illuminating the key members by cooperating with the light guide diaphragms; and wherein brightness of the light emitted by the light source is adjusted in response to light condition of the environment as sensed by the optical sensor.

The above and other objects, features and advantages of the invention will become apparent from the following detailed description taken with the accompanying drawings.

DETAILED DESCRIPTION OF THE INVENTION

Figure 1:
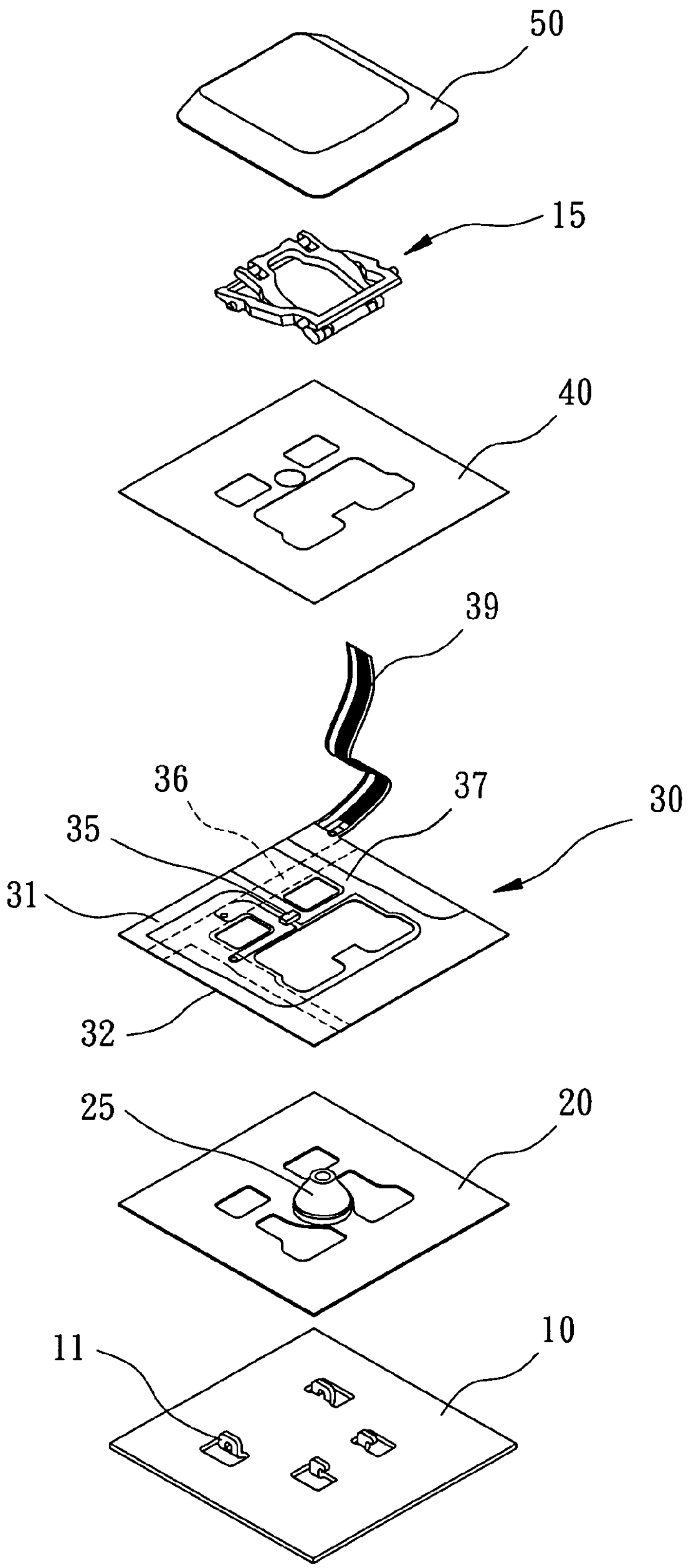
FIG. 1 is an exploded view of a unit of an illuminated keyboard according to the invention.
Figure 2:
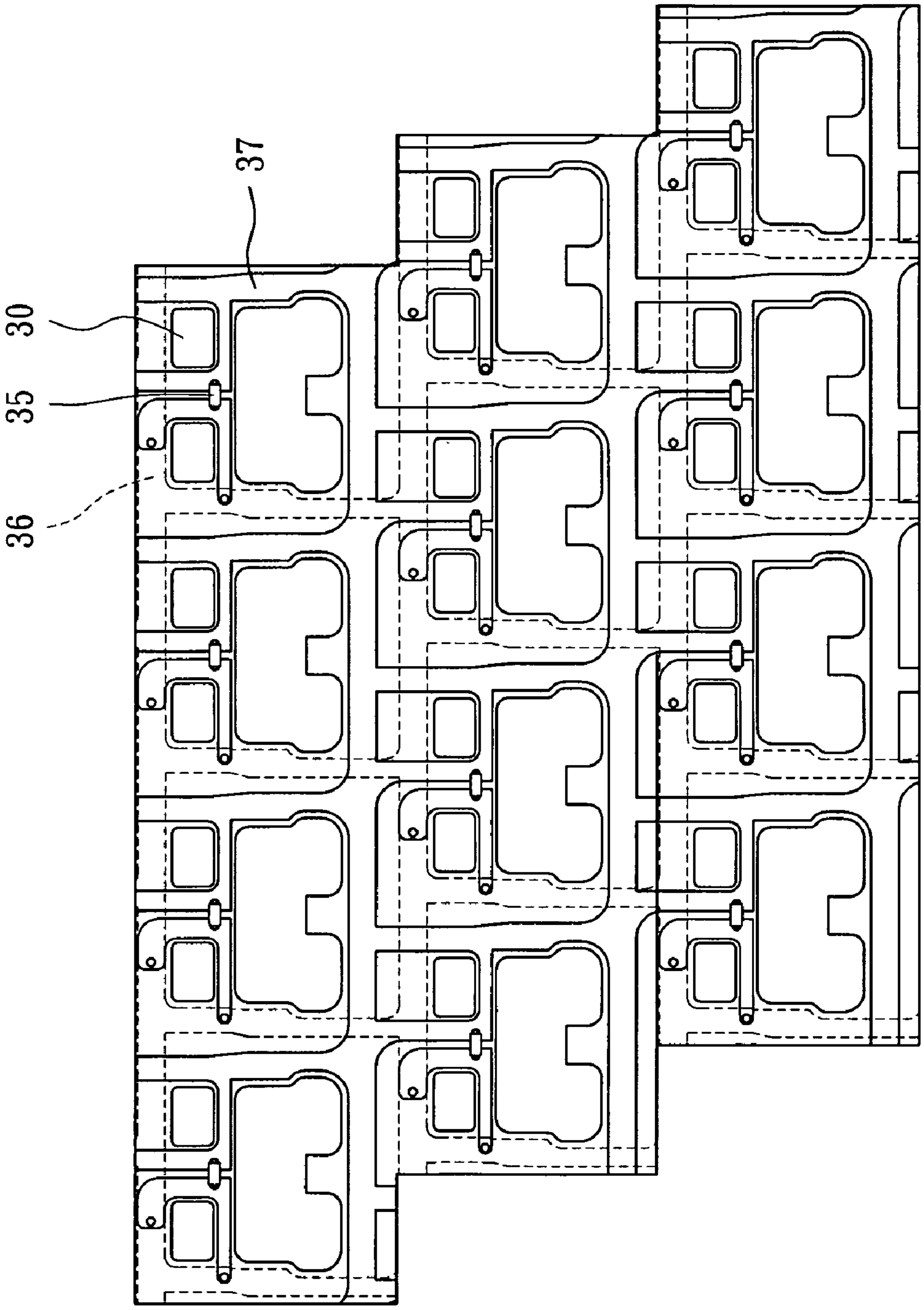
FIG. 2 is a top plan view of a plurality of insulating diaphragms shown in FIG. 1.
Figure 3:
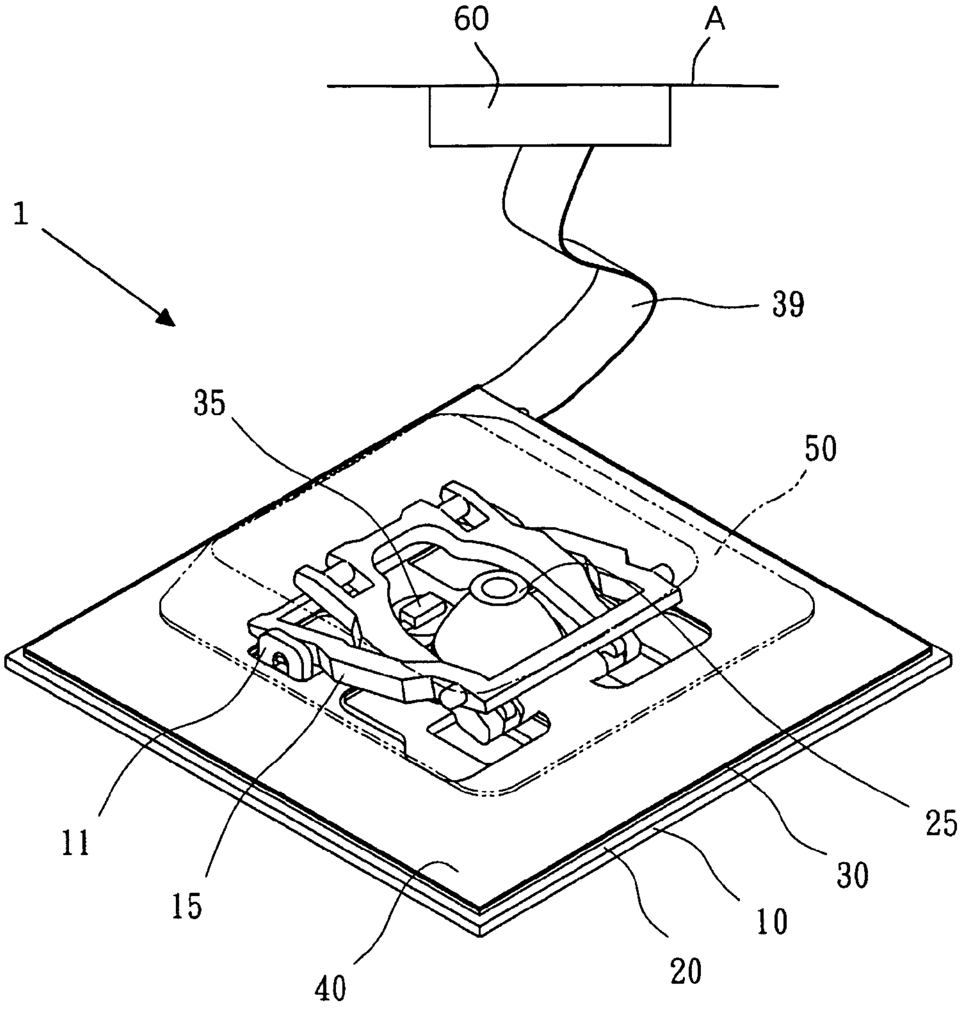
FIG. 3 is a perspective view of the assembled unit shown in FIG. 1.
Figure 4:
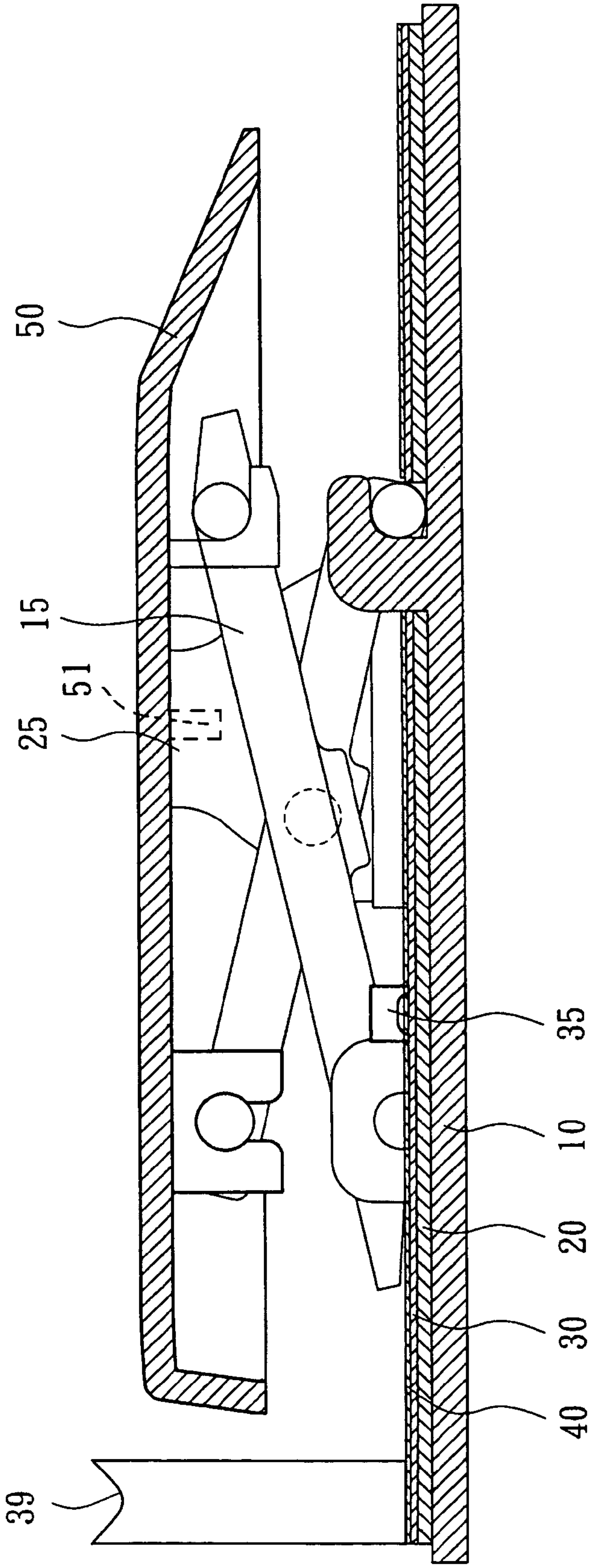
FIG. 4 is a longitudinal sectional view of the unit shown in FIG. 3.

Referring to FIGS. 1 to 4, an illuminated keyboard A in accordance with the invention comprises the following components as discussed in detail below.

A plurality of units 1 each comprises the following components. A key member 50 formed of optically transmissive has one or more symbols embedded thereon as known in the art and a key shaft 51 extending downward. A scissors-shaped structure 15 is provided under the key member 50. A light guide diaphragm 40 is provided under the scissors-shaped structure 15. An insulating diaphragm 30 is provided under the light guide diaphragm 40 and comprises a top surface 31, a light source (e.g., LED (light emitting diode), electroluminescent member, or LD (laser diode)) 35 on a central portion of the top surface 31, a bottom surface 32, a positive conductor 36 connected to a positive terminal of the light source 35 and provided on the top surface 31, a negative conductor 37 connected to a negative terminal of the light source 35 and provided on the bottom surface 32, and a bus 39 having one end electrically interconnected the positive conductor 36 and the negative conductor 37, and the other end electrically connected to an optical sensor 60 provided under a top surface of the keyboard A. It is noted that the provision of the positive conductor 36 on the top surface 31 and the negative conductor 37 on the bottom surface 32 can effect insulation so that a possible short-circuit is avoided.

A film circuit board 20 is provided under the insulating diaphragm 30 and comprises circuitry and a holed rubber dome 25 on a top central portion. A base board 10 comprises a plurality of anchoring members 11. The light guide diaphragm 40, the insulating diaphragm 30, the film circuit board 20, and the base board 10 are stacked together. Bottom of the scissors-shaped structure 15 is retained by the anchoring members 11 by passing through the light guide diaphragm 40, the insulating diaphragm 30, and the film circuit board 20 with the rubber dome 25 projecting upward therethrough. The key shaft 51 is inserted into the rubber dome 25 to be positioned therein by fastening on the scissors-shaped structure 15. When a key member 50 is pressed, it pushes down the scissors-shaped structure 15. A conductive contact on the underside of the rubber dome 25 touches and hence connects to a pair of conductive lines on the film circuit board 20. This in short closes a key switch to effect a known key pressing operation.

The sensor 60 may be activated when illumination of the environment is below a predetermined level. The activated sensor 60 may send an electrical signal to the light source 35 via the bus 39. The light source 35 is thus activated to emit light. The light can uniformly reach the underside of the key member 50 for illumination with the help of the light guide diaphragm 40. It is also envisaged that a sufficient illumination of the key members 50 can be effected since brightness of the light emitted by the light source 35 is automatically adjusted in response to the light condition of the environment as sensed by the sensor 60.

Preferably, the number of the sensors 60 is less than that of the key members 50 in order to save cost and for consideration of the congested internal space of the keyboard A.

It is contemplated that it is less likely to get dirt, debris, and other foreign objects into the keyboard A because the keyboard A is a low profile one with a minimized gap between the key member 50 and the structure thereunder.

While the invention herein disclosed has been described by means of specific embodiments, numerous modifications and variations could be made thereto by those skilled in the art without departing from the scope and spirit of the invention set forth in the claims.

What is claimed is:

1. A computer keyboard comprising:

a plurality of optical sensors mounted under a top surface of the computer keyboard; and a plurality of units each comprising:

an optically transmissive key member;

a scissors-shaped structure having a top secured to the key member;

a light guide diaphragm disposed under the scissors-shaped structure;

an insulating diaphragm disposed under the light guide diaphragm and including a light source on a top surface, a positive conductor electrically connected to a positive terminal of the light source and disposed on the top surface, a negative conductor electrically connected to a negative terminal of the light source and disposed on a bottom surface, and a bus having one end electrically interconnecting the positive conductor and the negative conductor, and the other end electrically connected to a corresponding optical sensor;

a film circuit board disposed under the insulating diaphragm and including a holed rubber dome with the key member positioned therein; and a base board including a plurality of anchoring members, wherein the scissors-shaped structure passes the light guide diaphragm, the insulating diaphragm, and the film circuit board to have bottom retained by the anchoring members of the base board;

wherein the optical sensors are activated to send electrical signals to each corresponding light source via the buses when light condition of the environment is below a predetermined level, and the light sources are activated to emit light for uniformly illuminating the key members by cooperating with the corresponding light guide diaphragms; and wherein brightness of the light emitted by the light source is adjusted in response to light condition of the environment as sensed by the optical sensor.

2. The computer keyboard of claim 1, wherein the light source is an LED (light-emitting diode).

3. The computer keyboard of claim 1, wherein the light source is an electroluminescent member.

4. The computer keyboard of claim 1, wherein the light source is a laser diode.

5. The computer keyboard of claim 1, wherein the number of the optical sensors is less than that of the units.

* * * * *